May 3, 1927.
F. D. ROHMER
COMBINATION LOCK
Filed Jan. 6, 1926
1,627,462
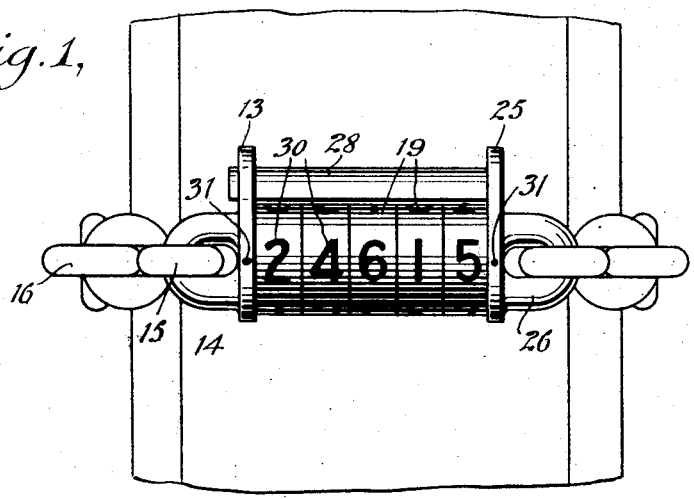
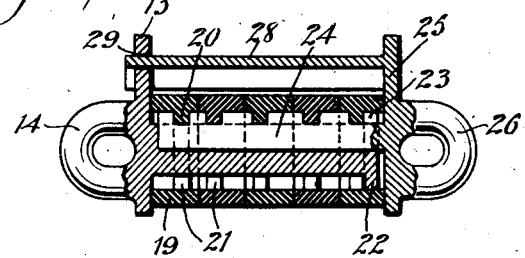
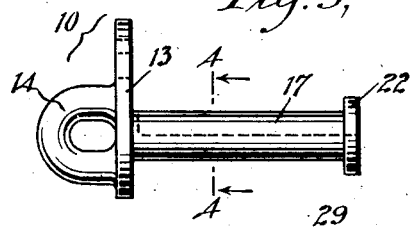
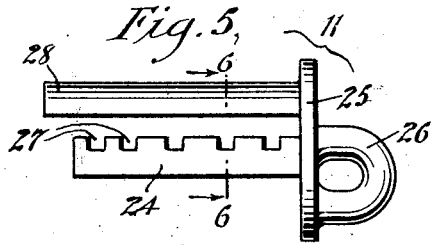
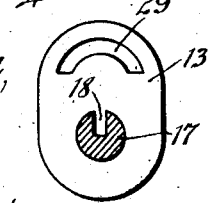
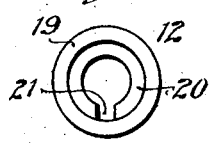
WITNESSES
Edw. Thorpe
Franklin J. Foster
INVENTOR
F. D. Rohmer
BY
ATTORNEYS Patented May 3, 1927.

1,627,462

UNITED STATES PATENT OFFICE.

FRANK DANIEL ROHMER, OF LACKAWANNA, NEW YORK.

COMBINATION LOCK.

Application filed January 6, 1926. Serial No. 79,622.

The lock of the present invention, while capable of a wide and varied number of uses, is particularly applicable as a chain lock for securing an automobile tire to a carrier, or for locking the spokes of a vehicle wheel to the axle.

An object of the invention is to provide a lock of the combination type which may be readily applied and readily opened by one familiar with the combination.

A further object is to provide a lock which will be proof against inexpert, unauthorized attempts to force it or break it.

Still further objects are to provide a lock of simple, practical construction which will be rugged, durable and efficient in use, which will be neat and attractive in appearance, and which will lend itself to economical manufacture.

With the above noted and other objects in view, the invention consists in certain novel features of construction and combinations and arrangements of parts, as will be more fully hereinafter set forth and pointed out in the claim. The invention may be more fully understood from the following description in connection with the accompanying drawings, wherein—

Fig. 1 is a view in front elevation showing my improved lock in applied position to lock an automobile tire to a carrier.

Fig. 2 is a view principally in longitudinal section through the lock showing the spindle section and key section engaged with each other and locked by the rotating tumblers.

Fig. 3 is a view in side elevation of the spindle section.

Fig. 4 is a view in transverse section on the line 4—4 of Fig. 3.

Fig. 5 is a view in side elevation of the key section.

Fig. 6 is a transverse sectional view on the line 6—6 of Fig. 5.

Fig. 7 is an end view of one of the rotating tumblers or discs.

I have shown in the drawings a preferred embodiment of the invention which includes a spindle section 10 (Fig. 3), and a key section 11 (Fig. 5) adapted to be interengaged with each other and locked in such engagement by the rotating tumblers or discs 12 (Fig. 7).

The spindle section 10 includes an abutment plate portion 13 formed on its rear side with an eye 14 adapted to receive the end of a flexible device, such for instance as the end link 15 of a chain 16. Projecting from the opposite face of the abutment plate 13 is a cylindrical spindle 17 formed with a groove 18 extending from the outer end of the spindle and terminating closely adjacent the abutment plate.

The rotating discs 12, each include outer ring portions 19 carrying inwardly presented flanges 20, said flanges being offset from the center of the discs. The flange of each disc is provided at one point in its periphery with a notch 21 of substantially the same width as the slot 18 in the spindle. The discs are slipped over the spindle, the inner disc abutting against the plate 13 and the flange 20 and the outer disc abutting a retaining member 22 welded or otherwise secured to the outer end of the spindle, and having a slot 23 therein (Fig. 2), registering with and forming a continuation of the groove 18. Obviously the retaining member might be integral with the spindle and the spindle welded or otherwise secured to the abutment plate after receiving the discs.

It will be evident that when the discs are rotated to align the notches 21 with the groove 18, the notches and the groove will co-operatively provide a channel into which the bolt portion 24 of the key section 11 may be entered by straight thrusting or sliding movement. The key section includes an abutment plate 25 substantially similar to plate 13, an eye 26 on the rear face of the abutment plate for receiving the other end of the chain 16, and the above mentioned bolt member 24 adapted to enter the groove 18 in the spindle, and formed with a series of notches 27 therein for permitting free rotation of the disc members after the bolt has been engaged in the spindle. The plate 25 also carries a combined bracing member and escutcheon plate 28 extending in parallelism with the bolt, but spaced therefrom to provide clearance for the free rotation of the discs. The bracing member 28 is preferably substantially arcuate in cross section, as seen most clearly in Fig. 6, although it may be of other cross sectional shape, and the end of said member is received in an arcuate or otherwise suitably shaped slot 29 in the abutment plate 13 of the spindle section. The member 28 offers a convenient place for engraving the name of the owner of the lock, or for attaching the plate of the maker.

The entire lock is preferably made of some suitable material such as steel, of sufficient hardness to resist attack with a hacksaw, chisel, hammer or file. The spindle section 10 may be all in one piece, except for the retaining member 22. All the parts of the key section 11 are either integral with each other or welded to the abutment plate. The exterior faces of the disc carry any suitable indicia, here shown as numerals 30. Rotation of the discs to bring proper numerals into alignment with marks 31 on the abutment plates 13, 25, move all of the notches 21 into registry with the groove 18, and permits free retraction of the bolt from the spindle. It will be obvious that any suitable number of discs might be used, and that each disc might carry as many numerals as desired on its periphery. I find however, that with a small lock of about the size shown in the drawings, it is most convenient to use only four numerals on each disc, these numerals being spaced 90° apart. The number of possible combinations may of course be increased by increasing either the number of discs or the number of numerals on each disc.

The entire lock may be covered with a waterproof case, or with waterproof material (not shown) to protect it from the rain or snow when used in exposed position on an automobile.

It will be evident that the principles embodied in the lock are readily applicable to other types of locking devices without making any material change in construction. The device might be used for instance as a padlock by simply curving the brace member 28 upwardly a sufficient distance, so that it would form a hasp, in which case the eyes 14 and 16 may be optionally omitted.

It is believed that the operation of the device will be evident from the foregoing description, and it will be understood that while the embodiment of the invention illustrated is a preferred one, it will be evident that various changes and alterations might be made in the general form and arrangement of parts described, without departing from the invention. Hence I do not wish to limit myself to the details set forth, but shall consider myself at liberty to make such changes and alterations as fairly fall within the spirit and scope of the appended claim.

I claim—

In a combination lock, a spindle section including a spindle having a longitudinally extending groove therein, a key section including a bolt received in the groove and formed with a notched edge projecting laterally beyond the groove, discs rotatable on the spindle, including inwardly presented flanges accommodated in the notches, and having cutouts adapted to register with the projecting edge of the bolt to permit retraction of the latter, abutment plates at the ends of the bolt and spindle, and a bracing member carried by one abutment plate and having its end received in a slot in the other abutment plate, said brace being arcuate in cross section and relatively wide to permit the attachment of an escutcheon plate.

FRANK DANIEL ROHMER.